United States Patent [19]

Griffin

[11] 4,001,122

[45] Jan. 4, 1977

[54] METHOD AND DEVICE FOR SEPARATING BLOOD COMPONENTS

[75] Inventor: Richard J. Griffin, Denver, Colo.

[73] Assignee: Telan Corporation, Denver, Colo.

[22] Filed: Aug. 22, 1973

[21] Appl. No.: 390,354

[52] U.S. Cl. .......................... 210/516; 210/DIG. 23

[51] Int. Cl.² .......................................... B01D 21/26

[58] Field of Search ............ 23/258.5, 259; 210/83, 210/84, 359–361, 369, 513, 516, DIG. 23; 233/1 A, 1 R, 26; 128/2 F, 214 R, 272, DIG. 5

[56] References Cited

UNITED STATES PATENTS

| | | | |
|---|---|---|---|
| 3,508,653 | 4/1970 | Coleman | 210/516 X |
| 3,780,935 | 12/1973 | Lukacs et al. | 210/83 |
| 3,786,985 | 1/1974 | Blaivas | 210/DIG. 24 |
| 3,814,248 | 6/1974 | Lawhead | 210/DIG. 23 |

*Primary Examiner*—Thomas G. Wyse
*Assistant Examiner*—R. G. Mukai
*Attorney, Agent, or Firm*—John E. Reilly; Earl C. Hancock

[57] ABSTRACT

Blood serum is separated from other components of whole blood by inserting a barrier device having a specific gravity between that of the blood serum and the other blood components into a centrifuge containing a sample of whole blood, and centrifuging until the barrier device migrates to a position intermediate the blood serum and the other blood components. The preferred form of the barrier device is a truncated cone having stabilizer posts extending from the conical base parallel to the axis of the cone in the direction of truncation.

9 Claims, 9 Drawing Figures

METHOD AND DEVICE FOR SEPARATING BLOOD COMPONENTS

This invention relates broadly to a barrier device for use in separating liquids of different specific gravities from a mixture thereof and to a method of separating different specific gravity liquids. More specifically, the invention is directed to a barrier device for separating blood serum from the heavier components of whole blood referred to hereinafter as blood clots, and to the method of affecting such separation.

Heretofore, blood clots have been separated from serum by centrification because of the difference in specific gravities of these components in whole blood. However, it is difficult to obtain a sharp separation of the various components through decantation alone and maintain such separation. Thus, if the technician is not highly skilled in the separation procedure, a portion of the red and white cells and fibrin will remain with the serum and adversely influence the results of tests performed on the respective blood components.

One object of the present invention is to provide a novel barrier device which will effect and maintain complete separation of blood serum from other constituents of blood without alteration of the electrolyte structure of the sera.

Another object of the invention is to provide a greatly simplified method of separating a mixture of liquids having differing specific gravities into their individual components which requires a minimal amount of technical expertise and is reliable and efficient in use.

A further object of the present invention is to provide a novel method and means for separating blood constituents of different specific gravity in which a barrier inserted into a tubular sample holder will be caused under centrifugal force to seek a position between the constituents of different specific gravity and in such a way as to permit release of air bubbles behind the barrier.

Liquids of differing specific gravities can be effectively separated during centrification by placing a barrier device having a specific gravity intermediate that of the respective liquid components on top of a mixture within a sample tube or holder, centrifuging the contents of the tube until the device migrates and displaces the lighter liquid component and forms an interface between the respective liquid components. The novel barrier device comprises a disc-shaped member having an outer diameter slightly less than the inner diameter of the centrifuge tube and at least one opening through the member large enough to allow the flow of the lighter specific gravity liquid component to flow therethrough. The device is constructed of a material having a specific gravity intermediate that of the liquids to be separated whereby the carrier device can migrate along the length of the centrifuge tube until it occupies a position intermediate the respective different specific gravity liquids. In its preferred form the barrier device comprises a truncated cone and integral stabilizing or guide means positioned around the base of the cone and extending therefrom in a direction parallel to the axis of the cone. The stabilizing means prevent the truncated cone from becoming canted or tipped while the barrier device migrates through the lighter specific gravity fluid, i.e. air or liquid, during centrification. The stabilizing means may be post-shaped, triangular-shaped or any other suitable geometric form. In addition to preventing the barrier device from becoming canted during the centrifuging operation, the guides also serve to allow the lighter specific gravity fluid to be decanted or otherwise removed, without disturbing or causing intermixing of the respective different specific gravity fluids.

Other objects, advantages and capabilities of the present invention will become more apparent as the description proceeds taken in conjunction with the accompanying drawings, in which.

Figure 1:
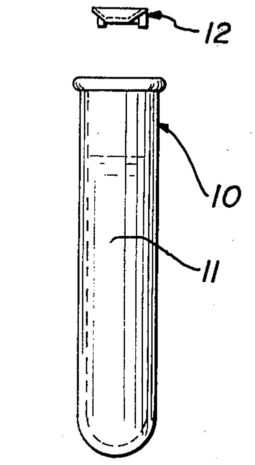
FIG. 1 illustrates the preferred form of the barrier device prior to introduction to a centrifuge tube containing a sample of whole blood.
Figure 2:
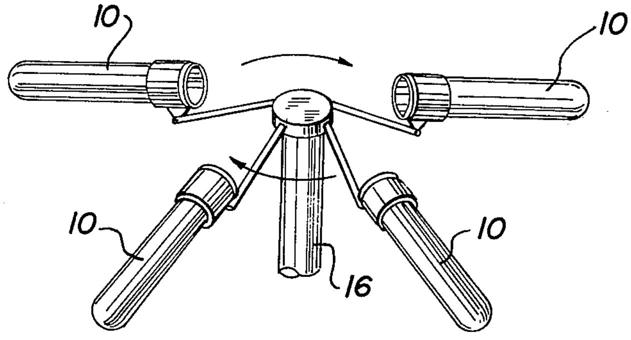
FIG. 2 illustrates the centrifuging action.
Figure 3:
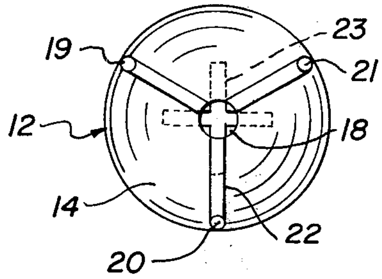
FIG. 3 is a bottom plan view of the preferred truncated cone embodiment of the barrier device.
Figure 4:
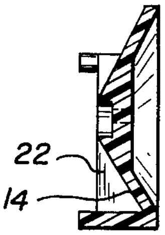
FIG. 4 is a cross-sectional view taken along lines 4—4 of FIG. 5.
Figure 5:
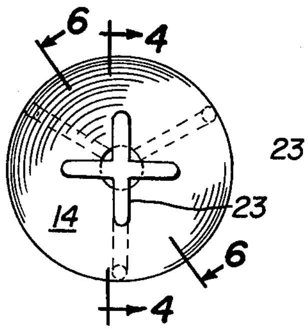
FIG. 5 is a top plan view of the barrier device.
Figure 6:
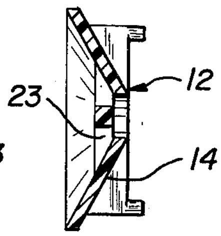
FIG. 6 is a cross-sectional view taken along line 6—6 of FIG, 5.

Referring now to the drawings in detail, there is shown by way of illustrative example in FIGS. 1 and 2 a sample holder in the form of a centrifuge tube 10 containing a whole blood sample 11. The blood sample may have a specific gravity range varying from about 1.035 to about 1.065. A preferred form of barrier device 12 is shown positioned above tube 10 prior to being placed on top of the blood sample 11 in tube 10 prior to centrification. The barrier device is composed of suitable material having an intermediate specific gravity of about 1.04 but may suitably range between 1.04 and 1.07. Examples of such material are the high impact styrene based plastic such as styrene acrylonitrile, acrylonitrile-butadiene-styrene and certain rubber modified styrene compositions containing up to about 20% rubber.

FIG. 2 illustrates the centrifuging action wherein four tubes 10 are rotated clockwise about a central rotating drive shaft 16, typically at a speed of about 2500 rpm for a period of 8 to 10 minutes.

FIGS. 3 through 6 show the preferred form of the barrier device 12. As shown, the barrier device 12 has a main body 14 in the form of a relatively flat truncated conical disc having a small central hole 18 located at the vertex of the cone. Three post-like guides or stabilizers 19, 20 and 21 are positioned at 120° intervals around the undersurface or base of the conical disc and extending from the base parallel with the axis of cone for a distance approximately equal to the height of the cone. Each stabilizer is provided with a radial reinforcing rib or web 22 to maintain its structural rigidity. A cross-shaped web member 23 is provided in the interior or upper surface of the cone to reinforce the cone and incidentally serves to restrict the effective size of the opening 18.

By way of example, a barrier device for use in a centrifuge tube 17/32 inch diameter by about 4½ inches long was made by injection molding a high impact styrene based plastic into a monolithic truncated conical disc having an effective diameter of just over ½ inch and a height of 3/16 inch, the diameter being such as to leave a clearance on the order of 0.005 inch between its outer periphery and the inner surface of the tube. The height of the three stabilizer posts is about ¼ inch, as measured from the base with a diameter of about 1/32 inch; and the size of the opening 18 was less than 1/16 inch in diameter. The specific gravity of the barrier device was 1.04, although the specific gravity may be as high as 1.07. Generally stated the specific gravity must be high enough to create sufficient differential pressure to force any air bubbles past the disc. After the molding operation was completed, the barrier device was deionized by passing it through a de-ionizing spray in accordance with procedures well known in the art.

Figure 7:
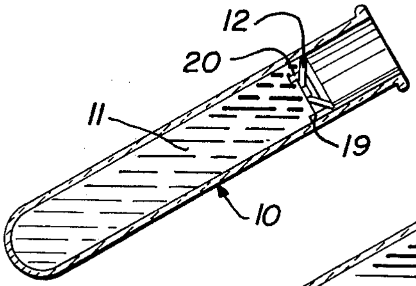
FIGS. 7, 8 and 9 illustrate the migration of the barrier device along the length of the centrifuge tube to a position intermediate two liquids of different specific gravities.
Figure 8:
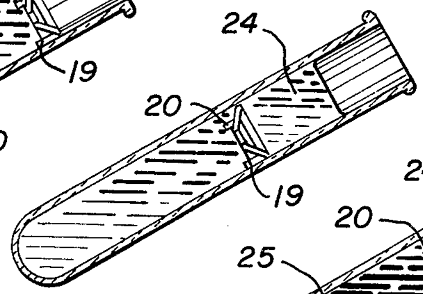
Figure 9:
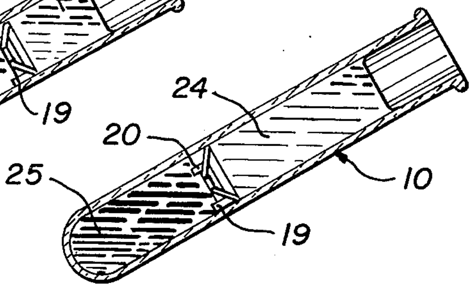

In use, the barrier device is illustrated in FIGS. 7 to 9 in its progression through a blood sample. In FIG. 7 the barrier device 12 is positioned in the test tube 10 on top of a sample of whole blood 11, and centrifuging is started by placing tube 10 on a machine as represented in FIG. 2. Outward progression of the barrier device toward the closed end of the tube 10 is shown in FIG, 8 wherein the barrier device 12, being of a higher specific gravity than liquid 24, gradually migrates through tube 10 as the lighter specific gravity component or blood serum 24 of the whole blood sample 11 passes through hole 18. FIG. 9 illustrates the final position of the barrier device 12 intermediate the lighter blood serum 24 and the heavier fiber and blood clot (packed red and white cells) 25. When the final stage of separation has been reached, the centrification is stopped. The blood serum 24 may then be readily decanted from the tube 10 without disturbing the heavier component 25. Throughout the centrification the truncated conical barrier device 12 is stabilized relative to the tube 10 and blood sample 11 by the guides 19 to 21 to prevent accidental tipping of the disc. The conical undersurface of the disc will not only encourage release of air bubbles but also will more readily accept and conform to the curvature of the clot 25 so that the red blood cells will not tend to migrate past the disc.

While the device illustrated herein is primarily intended for use in separating whole blood components, it will be understood that it may be used to generally separate fluid components having distinctly different specific gravities from a mixture thereof. It will also be understood that while the preferred embodiment of the invention has been illustrated and described, changes in construction and specific sequence may be made without departing from the spirit and scope of the invention as defined by the appended claims.

What is claimed is:

1. A barrier device for separating the sera, fibrin and heavier phases with the latter phase including red cells, white cells and platelet elements and wherein the phases have differing specific gravities from a blood sample within a tube or tubular holder, said barrier device comprising a circular member having an outer diameter less than the inner diameter of said tube with the diametric difference therebetween allowing gravity motivated movement of said barrier device coaxially in said tube with fluidic flow of the blood sample components past the peripheral edge of said circular member, said barrier device having a specific gravity intermediate that of the sera and the heavier phases of the blood sample to be separated, having at least one opening through said circular member large enough to allow the flow of at least the lighter components therethrough when the tube and said member are in an environment conducive to component separation based upon specific gravity differences along the axis of said tube, and having means including a series of projections spaced around the peripheral edge extending substantially in an axial direction from said circular member , whereby application of a migration inducing environment such as by centrifugal force to said tube will cause said member to migrate along the length of said tube while passing through the blood sample phases until it occupies a position intermediate the sera and the other blood sample phases.

2. The barrier device of claim 1 wherein said circular member comprises a truncated conical disc with said axial projection including means having post-like stabilizer means positioned around the base of said cone in proximity to the peripheral edge thereof and extending therefrom in a direction substantially parallel to the axis of said cone and in the direction of truncation.

3. The barrier device of claim 2 wherein the specific gravity of said barrier device is intermediate of the specific gravities of the fibrin and sera components, and the diameter of the hole located at the vertex of the truncated cone is about 1/16 inch in diameter, the diametric difference between the tube and said circular member being approximately 0.005 inches.

4. The barrier device of claim 2 wherein the specific gravity of said device is in the range on the order of 1.04 to 1.07.

5. The barrier device of claim 4 wherein said barrier device is constructed of a high impact styrene based plastic.

6. The barrier device of claim 2 wherein the post-like projection including means includes radial reinforcing ribs.

7. The barrier device of claim 2 wherein the diameter of said truncated cone is maintained constant by the interposition of a cross-like web support member positioned within the interior of the cone.

8. The barrier device of claim 2 wherein said post-like stabilizer means are positioned at 120° intervals around the base of said cone.

9. The barrier device of claim 2 wherein the barrier device is de-ionized.

* * * * *